United States Patent [19]

Bretches et al.

[11] Patent Number: 4,973,647

[45] Date of Patent: Nov. 27, 1990

[54] FIBER FROM POLYETHER-BASED SPANDEX

[75] Inventors: Donald D. Bretches, Waynesboro, Va.; Steven P. Pardini, Greenville, N.C.

[73] Assignee: E. I. du Pont de Nemours and Company, Wilmington, Del.

[21] Appl. No.: 363,271

[22] Filed: May 31, 1989

[51] Int. Cl.$^5$ .............................................. C08G 18/10
[52] U.S. Cl. .................................... 528/61; 156/433; 428/225
[58] Field of Search .......................... 528/61; 156/433; 428/225

[56] References Cited

U.S. PATENT DOCUMENTS

| | | | |
|---|---|---|---|
| 2,929,803 | 3/1960 | Frazer et al. | 260/77.5 |
| 3,507,834 | 4/1970 | Wittbecker | 260/75 |
| 3,549,596 | 12/1970 | McMillin et al. | 260/75 |

Primary Examiner—Maurice J. Welsh

[57] ABSTRACT

An improved spandex fiber is provided that is particularly useful for use in tricot-knit fabrics with nylon yarns. The fiber is formed from a polyether-based spandex polymer made from a poly(tetramethylene ether) glycol of about 2,200 molecular weight which was capped with methylene-bis(4-phenylisocyanate) and the resultant product then chain extended with a diamine mixture of ethylene diamine and 2-methyl-1,5-pentanediamine in a molar ratio of about 70/30.

4 Claims, 2 Drawing Sheets

FIBER FROM POLYETHER-BASED SPANDEX

BACKGROUND OF THE INVENTION

1. Field of the Invention

This invention relates to a dry-spun fiber made from a polyether-based spandex polymer which was formed by reacting a poly(tetramethylene ether) glycol with methylene-bis(4-phenylisocyanate) and then chain extending the resultant isocyanate-capped product with a mixture of ethylene diamine and a minor amount of a second diamine. In particular, the invention concerns an improvement in such a fiber, wherein the second diamine of the diamine mixture is 2-methyl-1,5-pentanediamine in a very narrow concentration range. The improved spandex fiber is particularly suited for use in tricot-knit fabrics.

2. Description of the Prior Art

Polyether-based spandex fibers derived from a poly(tetramethylene ether) glycol that was capped with methylene-bis(4-phenyl-isocyanate) and then chain extended with a diamine mixture that included ethylene diamine are known. Such a polyether-based spandex fiber is sold by E. I. du Pont de Nemours and Company as Type-136 Lycra® spandex yarn. These commercial yarns, which are made from a spandex polymer that had been was chain extended with an 80/20 molar mixture of ethylene diamine and hydrogenated m-phenylenediamire (also known as 1,3-diaminocyclohexane), have a highly satisfactory combination of tensile and elastic properties. However, tricot-knit nylon fabrics that include a minor percentage of the commercial spandex yarns in their construction often exhibit undesirable curling at the edges after being heated during finishing (e.g., in heat-setting or dyeing steps). Improvements are needed in the polyether-based spandex yarns to enhance the utility in knit fabrics.

The use of mixtures of diamines for the chain extension step in the preparation of various types of spandex polymers is also known in the art from published United States patents. Among others, Frazer et al U.S. Pat. No. 2,929,803, Wittbecker U.S. Pat. No. 3,507,834 and McMillin et al U.S. Pat. No. 3,549,596, each disclose that mixture of chain extenders may be employed in making spandex fibers. For example, in column 9, lines 55-74, Frazer et al lists primary and secondary diamines that may be mixed for use in the chain-extension step. However, the art does not disclose the use of 2-methyl-1,5-pentanediamine as a chain extender for making spandex polymer. Nor does the art disclose the use of 2-methyl-1,5-pentanediamine with ethylene diamine in the very narrow concentration ranges required in accordance with the present invention.

A purpose of this invention is to provide an improved spandex fiber that retains the favorable balance of tensile and elastic properties of commercial polyether-based spandex fiber, but improves the performance of spandex fiber in knit fabrics that are intended to be heat set.

SUMMARY OF THE INVENTION

The present invention provides an improved fiber formed from spandex polymer derived from a poly(tetramethylene ether) glycol that was capped with methylene-bis(4-phenylisocyanate) and then chain extended with a mixture of diamines that includes ethylene diamine. The improvement of the present invention comprises chain extending the capped glycol with a diamine mixture consisting essentially of ethylene diamine and 2-methyl-1,5-pentanediamine, the molar concentration of the 2-methyl-1,5-pentanediamine being in the range of 28 to 32 percent, based on the total diamine content of the diamines. Preferred fibers of the invention have a break elongation of at least 400%, load powers at 100% and 200% elongations of at least 6 and 16 milliNewtons/tex, respectively, a set of no more than 17% and a heat-set efficiency of at least 90%. Use of fibers of the invention in combination with nylon-6 yarns provides tricot fabrics with edge-curl resistance.

BRIEF DESCRIPTION OF THE DRAWINGS

The invention will be more readily understood by reference to the drawings in which.

DETAILED DESCRIPTION OF PREFERRED EMBODIMENTS

Figure 1:
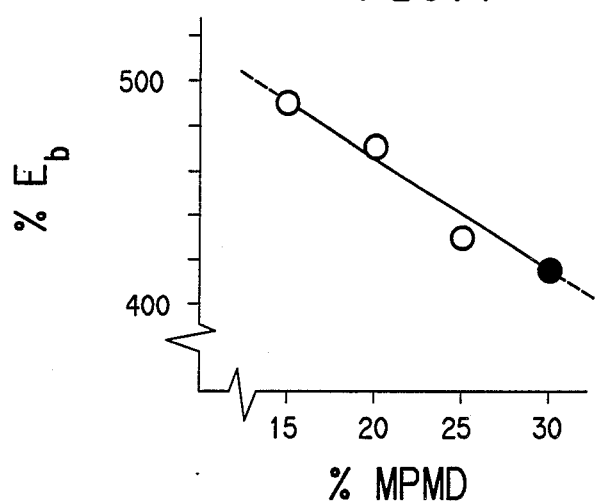
FIGS. 1-4 are graphs that respectively show the effects of 2-methyl-1,5-pentanediamine coextender concentration on the break elongation, power, set and heat set efficiency of spandex fibers of the invention in comparison to a commercial polyether-based spandex yarn and to such yarns made with MPMD coextender concentration outside the range required by the invention. The data from which the graphs were constructed are from the samples described in the Example below. The data represented by filled circles are for samples of the invention; the open circles are for comparison samples. Note the extraordinarily narrow concentration range of diamine coextenders over which the properties obtained are in the range desired for improved spandex filaments for tricot-knitting.
Figure 2:
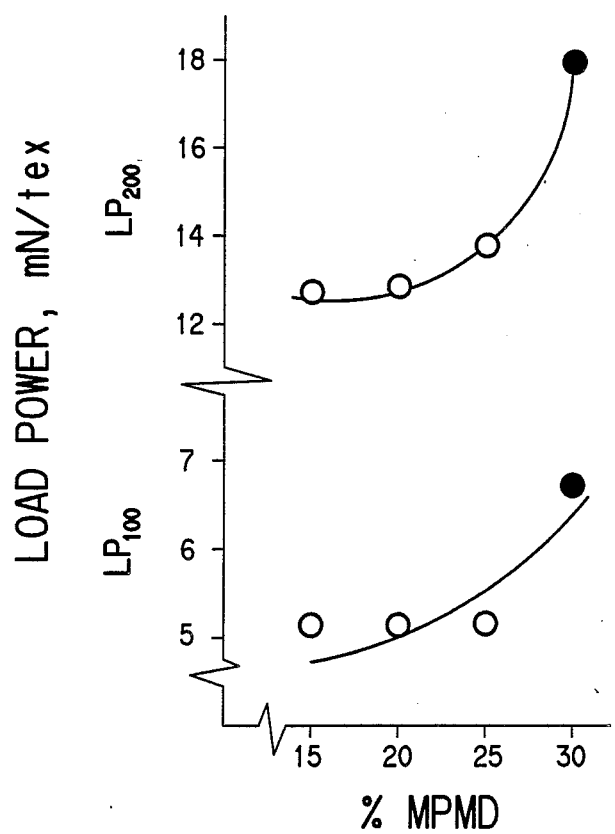
Figure 3:
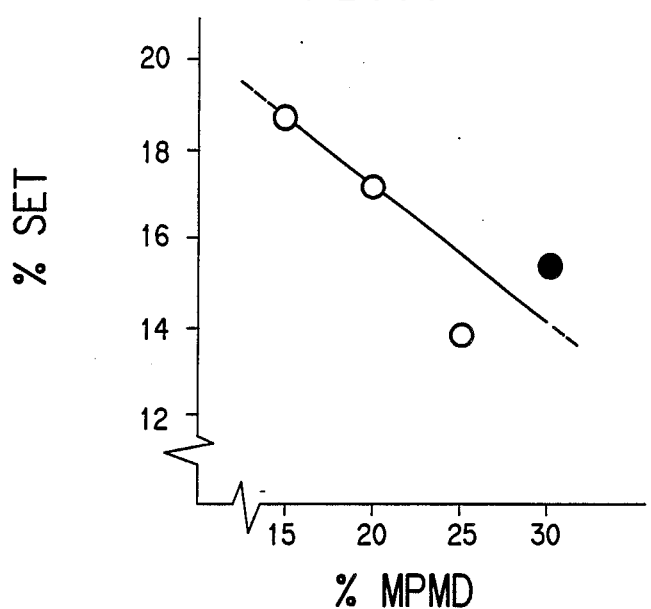
Figure 4:
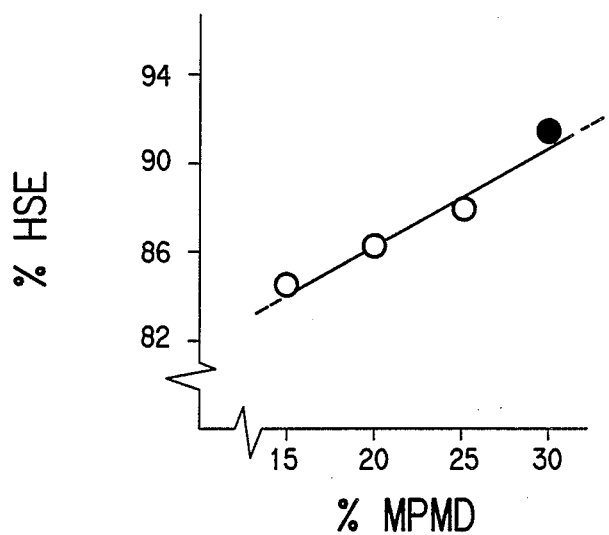

As used herein, the term "spandex" has its usual definition; that is, a long chain synthetic polymer that comprises at least 85% by weight segmented polyurethane. The terms "soft segment" and "hard segment" refer to specific portions of the spandex polymer chains. The soft segments are the polyether-based portions of the segmented polyurethane polymer, made from a poly(tetramethylene ether) glycol. The hard segments refer to the portions of the polymer chains that are derived from the diisocyanate, methylene-tis(4-phenyl-isocyanate) and the two-component chain-extending diamine mixture of the invention. "NCO content" refers to the isocyanate and group content of a polymer, before chain extension. "Molecular weight" means number average molecular weight. "Fiber" includes in its meaning staple fibers and continuous filaments.

For convenience, in the discussion and examples which are presented hereinafter, the following abbreviations may be used for the accompanying listed chemical:

| | |
|---|---|
| poly(tetramethylene ether) glycol | PO4G |
| number average molecular weight of PO4G | MW |
| methylene-bis(4-phenylisocyanate), also called p,p'-methylene diphenyl diisocyanate | MDI |
| isocyanate end group | NCO |
| ethylene diamine | EDA |
| 2-methyl-1,5-pentanediamine | MPMD |
| 1,3-cyclohexane diamine, also called hydrogenated m-phenylenediamine | HMPD |
| 1,1-dimethyl hydrazine, also called unsymmetrical dimethyl hydrazine | UDMH |
| N,N-dimethylacetamide solvent | DMAc |
| Copolymer of a 75/25 weight ratio of diisopropylaminoethyl methacrylate | DIPAM/DM |

| | |
|---|---|
| -continued | |
| and decyl acrylate | |
| "Cyanox" 1790 antioxidant, 2,4,6-tris-<br>(2,6-dimethyl-4-t-butyl-3-<br>hydroxybenzyl)-isocyanurate sold<br>by American Cyanamid | "Cyanox" |
| heat set efficiency | HSE |
| break elongation | $E_b$ |
| load power at 100% elongation | $LP_{100}$ |
| load power at 200% elongation | $LP_{200}$ |
| unload power at 100% elongation | $UP_{100}$ |
| unload power at 200% elongation | $UP_{200}$ |

The chemical composition of spandex polymers illustrated in the examples also may be abbreviated. Monomers of the repeating units of the polymer are separated by colons. Thus, for example, a commercial spandex polymer made from poly(tetramethylene ether) glycol (i.e., PO4G), methylene-bis(4-phenylisocyanate) (i.e., MDI) and a mixture of ethylene diamine (i.e., EDA) and hydrogenated m-phenylenediamine (i.e., HMPD) is abbreviated as PO4G:MDI:EDA/HMPD(80/20). Also, a polymer made in accordance with the present invention is abbreviated as PO4G(2,200):MDI:EDA/MPMD(70/30). The parenthetic 2,200 after the PO4G, represents the number average molecular weight of the glycol. Diamines separated by slashes (i.e., /) are in a mixture and the numbers parenthetically following such mixtures represent the respective molar percentages of each of the diamine constituents of the mixture.

In accordance with the present invention, the poly(tetramethylene ether) glycol which is used to form the soft segment of the spandex polymer usually has a number average molecular weight in the range of 2,000 to 2,400. Preferably, the glycol has a molecular weight in the range of 2,100 to 2,300.

To prepare the spandex polymer for fiber of the invention, the above-described PO4G is reacted (or "capped") in a conventional manner with an excess of MDI to form an isocyanate-terminated polymer. The NCO content of the isocyanate-terminated polymer preferably is in the range of 2.3 to 2.5%.

The capped polymer is then chain-extended with a two-component diamine mixture of EDA and MPMD to form the spandex polymer which is used to produce fiber of the invention. The molar concentration of each of these ingredients in the diamine mixture is 72 to 68% EDA and 28 to 32% MPMD. When he MPMD concentration exceeds the 32% maximum, fibers dry spun from the polymer do not have an adequate break elongation (i.e., greater than 400%). When the MPMD concentration is less than the 28% minimum, the fibers have inadequate heat-setting properties and tricot-knit fabrics made with the fibers exhibit excessive edge curling. These effects are illustrated in the Example below.

The chemical reactions used in preparing spandex polymer suitable for filaments of the present invention usually are carried out in an inert solvent, such as dimethylacetamide, dimethylformamide or the like. The filaments can be made by conventional dry-spinning techniques. The polymer can be dry spun into filaments from the same solvent as was used for the polymerization. Preferred filaments are dry spun at a speed of at least 700 meters per minute, most preferably at least 950 m/min, and coalesced into 4-filament yarns of about 35 to 45 dtex.

The filaments can then be heat set, if desired, usually by holding the filaments for 2 to 10 minutes at 145 to 165° C. while extended to 1.5 to 3.5 times their original length and thin immersing them in boiling water in a relaxed condition for at least 20 minutes. Higher setting temperatures for shorter times (e.g., at 195° C. for 30 seconds) sometimes can be employed satisfactorily.

The spandex polymer of the fiber of the invention can contain conventional agents that are added for specific purposes, such as antioxidants, thermal stabilizers, UV stabilizers, pigments, dyes, lubricating agents and the like.

The following test procedures are used in the Example and Comparisons below for measuring various characteristics of spandex fibers.

The number average molecular weights for the polyether diols are each determined from the hydroxyl number of the polyether diol, which is measured by the imidazole-pyridine catalyst method described by S. L. Wellon et al, "Determination of Hydroxyl Content of Polyurethane Polyols and Other Alcohols", *Analytical Chemistry*, Vol. 52, No. 8, pp. 1374–1376 (July 1980).

The NCO content of isocyanate-capped polyether is measured by the method of S. Siggia, "Quantitative Organic Analysis via Functional Group", 3rd Edition, Wiley & Sons, New York, pages 559–561 (1963).

The diamine coextender composition of the spandex polymer can be determined by the steps of (a) degrading the soft segment of the polymer in boron trifluoride etherate, (b) adding water to precipitate the hard segment, (c) filtering and drying the hard-segment precipitate, (d) dissolving the hard segment in deuterated dimethylsulfoxide and (f) analyzing the nuclear magnetic resonance spectra to determine hydrogen bonds from which the relative amounts of EDA to MPMD can then be determined.

Strength and elastic properties of the spandex filaments are measured in accordance with the general method of ASTM D 2731-72. Three filaments, a 2-inch (5-cm) gauge length and a zero-to-300% elongation cycle are used for each of the measurements. The samples are cycled five times at a constant elongation rate of 800% per minute and then held at the 300% extension for half a minute after the fifth extension. "Power" is the stress at an extension of 100% or 200% for the fifth load or unload cycle and is reported in milliNewtons per tex. Percent elongation at break is measured on the sixth extension cycle.

Heat set efficiency is measured on samples that are stretched and held at one-and-a-half times their original length, heated at 195° C. for 60 seconds, relaxed and then immersed in boiling water for 30 minutes. The heat set efficiency ("% HSE") is then calculated as $$\% \ HSE = 200(L_f - L_o)/L_o,$$

where $L_o$ and $L_f$ are respectively the filament length, when held straight without tension, before and after the heat setting treatment.

Edge curl of tricot fabrics containing spandex yarns is rated as follows. A tricot-knit fabric is prepared by conventional techniques on a LIBA knitting machine using a "locknit" stitch, a speed of 2,000 stitches per minute and 28 needles per 2.54 centimeters. The machine is supplied with 56-dtex, trilobal cross-section nylon-6 yarn and with 44-dtex spandex yarn. The knitted fabric has a finished weight of 180 grams per square meter, of which 28 g/m² is spandex yarn. The fabric is scoured continuously for one minute with perchloroethylene at 45° C. and then heat set on a tenter frame in a hot-air oven operating at 190° C. for 1 minute. Then, in a beam dyer, the fabric is (a) scoured again at 70° C. for 30 minutes in an aqueous bath containing detergents and surfactants, (b) bleached for 10 minutes in a cold aqueous hypochlorite bath and cold rinsed, (c) dyed by soaking in water at 25° C. for 10 minutes, followed by soaking for 45 minutes in a 100° C. aqueous dye bath at pH 5.0, cooling to 25° C. within 40 minutes and cold rinsing and (d) finished by soaking for 20 minutes in a 70° C., 4.8 pH aqueous bath containing "Mesitol" NBS, followed by cooling to 25° C., cold rinsing, and drying. The dried fabric is then conditioned for 16 hours at 21° C. and 65% relative humidity. Four 15-cm long cuts are made in a sample of the fabric at angles of 45, 90, 135 and 180 degrees to the direction of the knit courses and intersecting each other at the mid-point of each cut to form eight triangular flaps, each flap having a 45 degree apex angle. The sample is allowed to rest on a flat surface for another hour at 21° C. and 65% relative humidity. The points of the triangular areas formed by the cuts in the fabric are then examined and rated for edge curl. If no curling of the flaps is detected, the fabric is rated "1". A small, but acceptable, amount of edge curling is rated "2". Fabric flaps that curl more than one-half a turn (i.e., the apex of the flap turns toward the flat surface of the fabric to form more than half a "turn") are considered unacceptable and rated "3". Fabrics that curl a "full turn" or more are rated "4" and are considered completely unacceptable.

EXAMPLE

This example illustrates the physical property advantages of spandex fibers of the invention and its particularly good non-curling performance in heat-set tricot-knit fabrics. The superiority of the spandex fibers of the invention is demonstrated in comparison to fibers made from a commercial polyether-based spandex (Sample D) and from spandex polymers that differ in spandex polymer composition from the fibers of the invention only in the relative amounts of EDA and MPMD diamine chain extenders In this example, all fiber samples are prepared from a spandex polymer formed from poly(tetramethylene ether) glycol ("PO4G") of 2,100 molecular weight which was capped with methylene-bis(4-phenylisocyanate) ("MDI) and then chain extended with a mixture of ethylene diamine ("EDA") and 2-methyl-1,5-pentane diamine ("MPMD"), with one exception, Comparison Sample D. Sample D is made from a PO4G(1,800):MDI:EDA/HMPD(80/20) commercial polyether-based spandex in which the HMPD was a 65/35 cis/trans mixture. The spandex polymer for each of the samples is prepared by substantially the same procedure. The fiber properties of Comparison Sample D indicate what is satisfactory in commerce.

Each of the polymers required for the test samples was prepared in a continuous polymerizer. One hundred parts by weight of PO4G of 1,800 molecular weight (or 116.7 parts of PO4G of 2,100 molecular weight) were mixed with 23.61 parts of molten MDI at 45 to 50° C., heated to 95° C. and then held for 90 minutes at that emperature, to form an isocyanate-capped polymer having an NCO content of 2.40%. After cooling to about 60° C., 100 parts of the capped polymer were diluted with 150 parts of DMAc solvent, which contained sufficient 1,1-dimethylhydrazine ("UDMH") to yield about 18 milliequivalents of semicarbazide end groups per kilogram of final spandex polymer. The diluted capped polymer was then chain extended with a DMAc solution of EDA and MPMD in the molar ratios lifted in the table below and simultaneously chain terminated by addition of a DMAc solution of diethylamine to form 27 milliequivalents of diethylurea end groups per kilogram of final spandex polymer. The final polymer solution contained 38.3% polymer solids. Primary amine end groups derived from EDA and MPMD amounted to 15 meq/kg. Polymer end groups of all types amounted to 60 meq/kg. The number average molecular weight of the polymer was about 33,000.

After polymer preparation, as described in the preceding paragraph, a DMAc slurry of additives was mixed into each polymer solution, to yield a solution that contained 38.8% solids. The additives were zinc oxide, "Cyanox" 1790 antioxidant, DIPAM/DM and silicone oil, amounting respectively to 3.0, 1.5, 2.0 and 0.6 percent, based on the weight of the final spandex polymer. The thusly formed mixture of additives and polymer solution was then dry spun through spinnerets in typical commercial-size equipment to form 10 denier (11 dtex) filaments which were combined into 4-filament coalesced-filament yarns of 44 dtex that were wound up at 915 meters per minute except sample D which was wound up at 732 meters/minute.

Properties of the samples produced by the procedures of this example are summarized in the table below. Each reported value is the average of at least 15 samples. Note the relatively poor heat set efficiency of Comparison Samples A–C versus the sample of the invention. Also note the superior characteristics of the sample of the invention versus the "commercial" Comparison Sample D. Most importantly, note the much better tricot-fabric curl performance of the sample of the invention versus the comparison samples.

TABLE

|  | Sample of Invention | A | B | C | D |
|---|---|---|---|---|---|
| Molar Ratio, EDA/MPMD | 70/30 | 75/25 | 80/20 | 85/15 | * |
| $E_b$, % | 416 | 433 | 475 | 489 | 433 |
| % Set | 15.1 | 13.7 | 16.9 | 18.7 | 18.8 |
| % HSE | 92 | 88 | 87 | 85 | 89 |
| Load Power, mN/tex |  |  |  |  |  |
| $LP_{100}$ | 6.6 | 5.2 | 5.4 | 5.4 | 6.3 |
| $LP_{200}$ | 17.5 | 13.8 | 13.0 | 12.9 | 15.5 |
| Edge-curl Rating | 1 | 3 | 4 | 4 | 2 |

* A commercial polymer containing 80/20 EDA/HMPD

We claim:

1. An improved fiber formed from a spandex polymer derived from a poly(tetrametheylene ether) glycol that was capped with methylene-bis(4-phenylisocyanate) and then chain extended with a mixture of diamines that includes ethylene diamine, the improvement comprising chain extending the capped glycol with a diamine mixture consisting essentially of ethylene diamine and 2-methyl-1,5-pentanediamine, the molar concentration of the 2 methyl-1,5-pentanediamine being in the range of 28 to 32 mole percent, based on the total diamine content of the diamines.

2. A fiber in accordance with claim 1 wherein the number average molecular weight of the glycol is in the range of 2,000 to 2,400.

3. A fiber in accordance with claim 2 having a break elongation of at least 400%, load powers at 100% and 200% elongations respectively of at least 6 and 16 milliNewtons/tex, a set of no more than 17% and a heat-set efficiency of at least 90%.

4. A tricot knit fabric of nylon-6 and spandex yarns in which the spandex yarns are formed from filaments in accordance with claim 3.

* * * * *